Oct. 24, 1950     O. M. GAHAGAN     2,526,739

CATHEAD

Filed May 21, 1945     2 Sheets—Sheet 1

INVENTOR
Orren M. Gahagan.
BY
Fishburne Mullendore
ATTORNEYS

Oct. 24, 1950      O. M. GAHAGAN      2,526,739
CATHEAD
Filed May 21, 1945      2 Sheets-Sheet 2
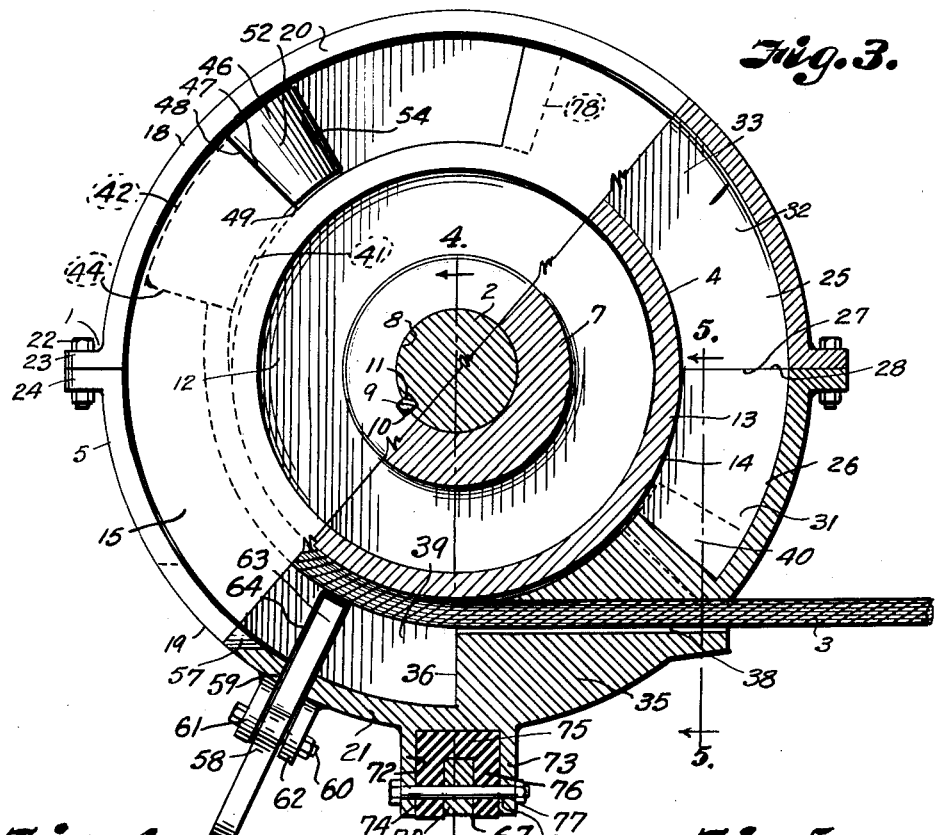
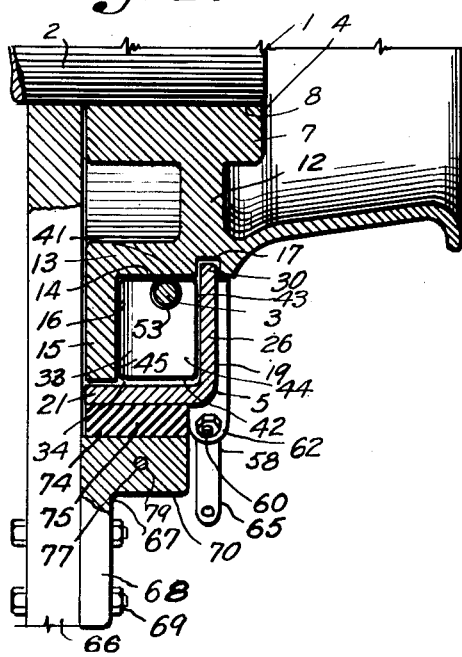
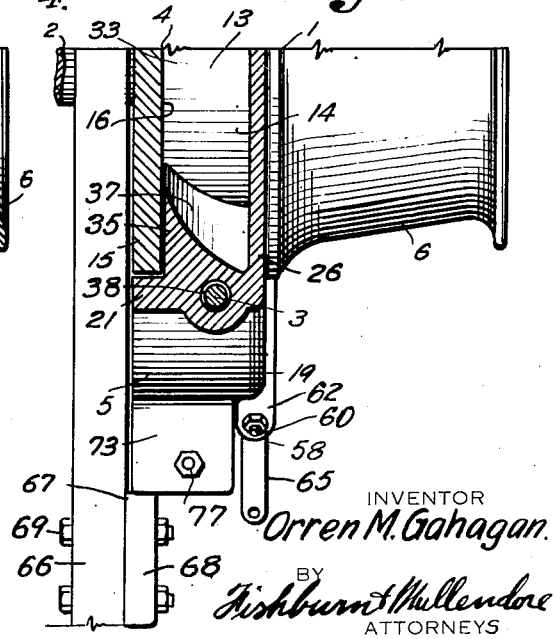
INVENTOR
*Orren M. Gahagan*
BY
*Fishburn & Mullendore*
ATTORNEYS Patented Oct. 24, 1950

2,526,739

UNITED STATES PATENT OFFICE 2,526,739

CATHEAD

Orren M. Gahagan, Dallas, Tex.

Application May 21, 1945, Serial No. 594,939

9 Claims. (Cl. 254—173)

This invention relates to a device for operating a jerk line employed in setting up and breaking the tool joints of drill pipe and similar operations encountered in drilling of earth formations and has for its principal objects to provide a device of this character that is compact and of relatively small overall dimensions, yet capable of exerting a long stroke on the line.

Other objects of the invention are to provide for positive connection and automatic disconnection of the jerk line with a rotary power shaft; to provide a device of simple compact and durable construction; to provide a resilient mounting for absorbing shock incidental to application of power on the jerk line and resultant recoil of the line incidental to breaking loose of a threaded joint; to provide a relatively simple and strong latch member normally retained out of engagement with the rotor member of the device incidental to stiffness of the jerk line; to provide a device wherein the latch or coupling member is shifted into lateral engagement with the rotor or driving element with a minimum movement of the latch or coupling member; to provide a coupling structure which is not effected by centrifugal force when in operation; and to provide a jerk line actuating device wherein the latch or coupling member is at all times retained in guided contact with the way in which it operates.

In accomplishing these and other objects of the invention, I have provided improved structure, the preferred form of which is illustrated in the accompanying drawings wherein:

Fig. 3 is a view of the device showing one-half in elevation and the other half in section to illustrate action of the jerk line and the coupling or latch member in engagement with the rotor.

Fig. 4 is a section on the line 4—4 of Fig. 3.

Fig. 5 is a section on the line 5—5 of Fig. 3.

Figure 1:
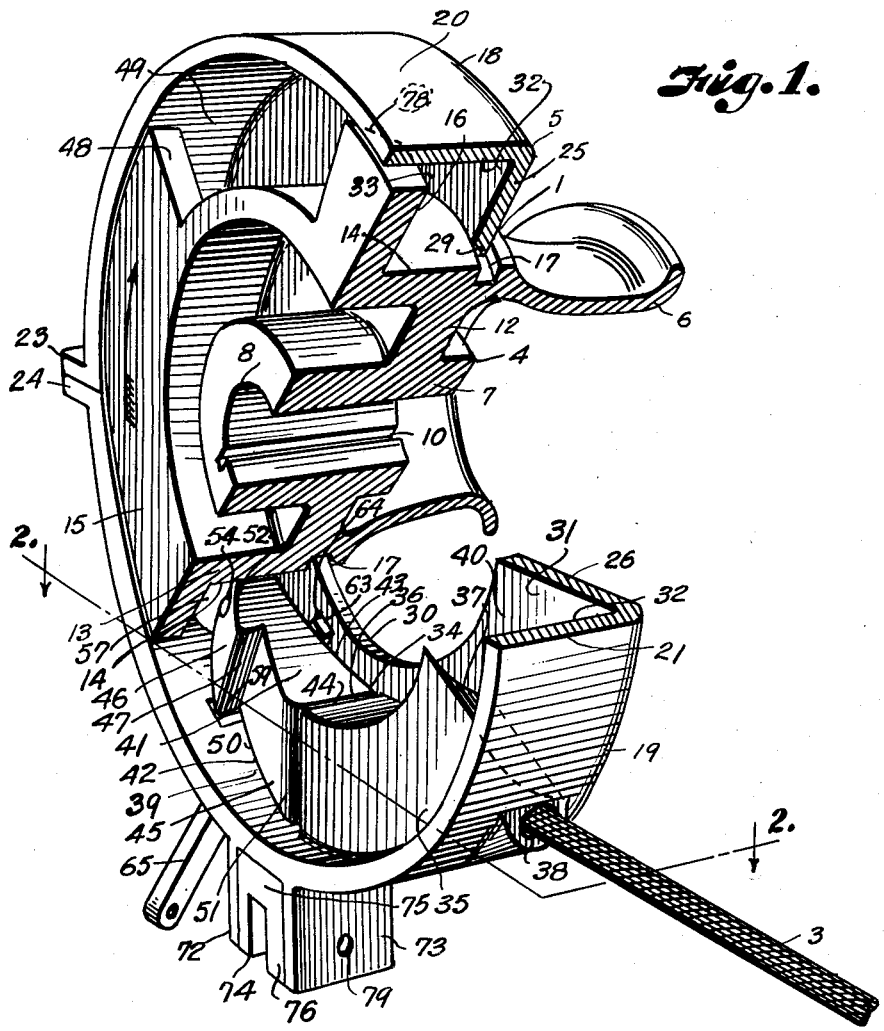
Fig. 1 is a perspective view of a device constructed in accordance with the present invention, parts of the rotor and stator being broken away to better illustrate the construction.

Referring more in detail to the drawings:

1 designates a cathead adapted for application to the line shaft 2 of a draw works in a drilling rig and which is used for applying power to a jerk line 3, the jerk line 3 being connected with wrenches or tongs employed in the making up and breaking of joints of casing, tool joints of drill pipe, and like threaded connections incidental to drilling practices.

In the illustrated instance, the cathead includes a rotor or driving member 4, a housing-like stator 5, and a catline tapering spool 6 formed as a part of the rotor. The rotor or driving member 4 includes a hub portion 7 having a bore 8 to pass the line shaft 2 when the rotor is mounted thereon and connected in driving relation therewith by a key 9 engaged in registering grooves 10 and 11 in the hub and shaft respectively. Extending circumferentially of the hub portion 7 intermediate the ends thereof is an annular web 12 carrying a substantially cylindrical body 13 that has a face 14 forming the inner side of an annular way 33 later described. Extending laterally from the cylindrical body portion 13 at one end thereof is an annular flange 15 having an inner face 16 forming a side of the annular way just mentioned.

The catline pulley 6 projects from the opposite end of the tubular body and is preferably formed integrally therewith as shown in Figs. 1 and 4. Formed in the cylindrical body substantially in registry with the web 12 and in spaced relation with the flange 15 is an annular groove 17 adapted to retain a substantially fixed relationship between the rotor 4 and the stator 5. The stator 5 comprises a housing 5 adapted to enclose the body portion of the rotor 4 and to facilitate assembly is preferably formed of mate sections 18 and 19 having arcuate walls 20 and 21 secured together by fastening devices 22 extending through flanges 23 and 24 at the respective sides of the sections as best shown in Fig. 3. The sections also include inwardly extending flange portions 25 and 26 having abutting ends 27 and 28 and inner faces 29 and 30 engaged within the annular groove 17 of the rotor body, the arcuate flange portions of the sections having sufficient depth to project over the periphery of the rotor flange 16 and have inner faces 31 which cooperate with inner faces 32 of the flange portions thereof and with the faces 14 and 16 of the rotor to enclose the annular way 33 above mentioned. The way 33 is thus of substantially rectangular cross section and corresponds in shape with a latch or coupling member 34 operable therein as later described.

Figure 2:
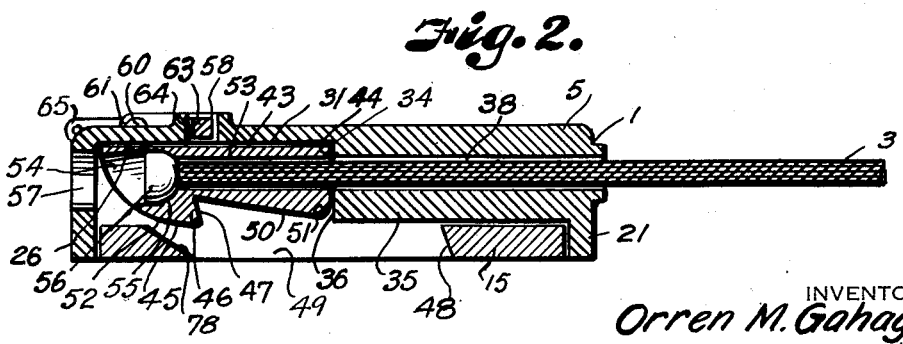
Fig. 2 is a cross section on the line 2—2 of Fig. 1 particularly illustrating the latch or coupling member of the jerk line and the notch portion of the rotor to be engaged thereby.

Carried within the section 21 of the stator is a block 35 which may be formed integrally therewith and substantially completely fills the way at the lower portion thereof to provide a stop face 36 at substantially right angle to the axis of the rotor and substantially in a plane extending through the vertical diameter as shown in Fig. 3. The opposite end of the block 35 has a face 37 curved downwardly from adjacent the rotor flange 15 to the flange of the stator for effecting disengagement of the latch 34 or coupling member as later described. Extending through the block substantially tangential with the body portion of the rotor is a channel 38 that extends through the stop face 36 and through the wall portion 21 of the stator as shown in Fig. 3. The channel 38 is of sufficient height to pass the jerk line 3 therethrough and wind on the face 14 of the rotor. The channel is preferably wider than the jerk line to allow free and some lateral shifting movement of the jerk line therein. The block 35 thus described forms the terminals of the way 33 and constitutes a rest station 39 for the latch or coupling member at one end of the way and a latch disengaging station 40 at the other end of the way. The latch or coupling member includes a substantially arcuate-shaped body of generally rectangular cross section and having curved inner and outer faces 41 and 42, the outer face 42 conforming in radius to the outer radius of the way 33 so that the latch member is supported thereon and guided through the way. The inner face 41 is of slightly larger radius than the radius of the body portion 13 of the rotor to allow clearance therebetween but is close enough to assure guided movement of the latch member. The side face 43 of the latch member is parallel with the face 31 of the stator and lies substantially thereagainst when the latch member is disengaged from the rotor as shown in Figs. 1 and 4. The end 44 of the latch member is adapted to abut against the face 36 under pull of the jerk line which retains the side 43 thereof in contact with the flange 26 of the stator and the opposite side 45 out of contact with the flange 15 of the rotor. The side 45 is shaped to provide a latch portion 46 having a transverse portion 47 extending thereacross and adapted to be engaged by a similar face portion 48 formed by the end of an arcuate notch 49 in the flange 15 of the rotor. The face 45 of the coupling member tapers as at 50 toward the end face 44 and meshes therewith through a rounding curve 51 on which the latch member is adapted to rock when the hook 46 thereof is adapted to be moved through the arcuate notch 49 to be engaged by the face 48 on the rotor. The portion of the latch 34 forwardly of the face 47 rounds inwardly as at 52 to join the back face 43 and which is adapted to engage the rounded face 40 of the deflector 37 to effect disengagement of the latch 34 as later described. The latch member 34 has a bore 53 extending therethrough and registrable with the channel 38. The end of the bore extending through the rounding face 52 of the hook portion is counterbored as at 54 to provide an annular concave seat 55. The end of the jerk line extends through the bore and carries a button 56 which enters the counterbore and engages the seat 55 to anchor the jerk line 3 to the latch member 34. In order to insert the line, the flange 21 of the lower section of the stator has an opening 57 in the side thereof in registry with the axis of the channel 38 and which is of large enough diameter to pass the button or knob 56 of the jerk line therethrough. The latch member 34 is shifted laterally away from the flange 26 to bring the latch portion 46 thereof into engagement with the flange face 48 of the rotor and to move the latch portion 46 through the notch opening 49 by means of a shift lever 58 operable in a transverse slot 59 of the stator and pivotally supported on the pin 60 carried by spaced ears 61 and 62 located on the respective sides of the slot as best shown in Fig. 3. The latch-engaging end of the lever operates through an upward extension 64 of the slot 63 and engages the rear face 43 of the latch member 34 as best shown in Figs. 1 and 2. The outer end 65 of the lever projects from the stator and is suitably shaped to connect an operating line (not shown).

In order to support the stator in a relatively fixed position, and in substantially coaxial relation with the rotor, the stator is anchored to a fixed part of the draw works; for example, an adjacent jackpost 66 thereof by a bracket 67 having a leg or plate portion 68 adapted to be secured by fastening devices such as bolts 69. Extending laterally from the leg 68 is an arm 70 positioned between spaced ears 72 and 73 on the lower section of the stator and which cooperate with the arm 70 to embrace a shock absorbing pad 74. The shock absorbing pad is preferably of channel shape to provide a web portion 75 engaged between the flange 21 of the stator and the arm 70 and spaced parallel portions 76 engaged between the ears 73 and the respective sides of the arm 70 as best shown in Figs. 1 and 3. A fastening device such as a bolt 77 is passed through registering openings 79 in the ears and the arm 70 to retain the shock absorbing pad. In case of reverse rotation of the rotor the latch or coupling member 34 is pushed out of the flange notch 49 by means of a bevel 78 formed at the end of the notch opposite the face 48.

In assembling the device, the stator sections 18 and 19 are inserted over the body portion of the rotor with the flanges 29 and 30 thereof engaging in the annular groove 17 of the rotor. The fastening devices 22 are then passed through the openings in the ears 23 and 24 to secure the sections together. The latch member 34 is then passed through the notch 49 of the rotor flange 15 so that the end 44 thereof seats against the stop face 36 with the bore 53 therein registering with the channel 38. The assembled unit is then applied on the drive shaft 2 and secured by the key 9. The bracket 67 is then applied to the post 66 of the draw works so that the arm 70 thereof projects through the opening formed by the shock absorbing pad 74. The fastening device 77 is then inserted through the registering openings 79 and a nut applied thereon. The shift lever 58 is then connected with an operating cable leading to a position adjacent the driller's position on the derrick floor. The end of the jerk line 3 to be attached to the tongs is threaded through the opening 57 through the counterbore 54 and bore 53 of the latch member and through the channel 38 so that the bottom or knob 56 thereon engages the seat 55. The free end of the jerk line is then attached to the tong as in usual practice.

When the draw works is in operation, the shaft 2 is actuating the rotor 4 but the latch member 34 is retained in retracted position 39 relative to the flange 15 of the rotor so that the face 48 of the flange 15 rotates freely thereby. When the jerk line is to be actuated the shift lever 58 is operated to pivot the latch member 34 into engagement with the flange 15 of the rotor so that the latch portion 46 will pass through the notch 49 when the notch registers therewith. The face portion 47 is then in position to be engaged by the end face 48 of the notch so as to pick up the latch member and carry it about the way for wrapping the jerk line around the face 14 of the rotor as shown in Fig. 3 to apply power on the tongs. As soon as the rounded end 52 of the latch member 34 engages the deflecting face 37 of the block 35, the latch face 47 is disengaged from the latch engaging face 48 of the rotor and the latch member 34 is shifted out of engagement with the flange 15 so that the latch or coupling member is free to return to rest position 39 against the face 36 under recoil of the jerk line or through repositioning of the tongs. After disengagement, the latch member is kept free of the rotor flange incidental to rigidity of the jerk line.

From the foregoing it is obvious that I have provided an automatic cathead of sturdy lightweight construction constituting fewer parts and arranged in compact relation so that it is well adapted for its intended purpose.

What I claim and desire to secure by Letters Patent is:

1. An apparatus of the character described including a rotor adapted to rotate about a fixed axis and having a circumferential face and a flange extending radially and circumferentially at one end of said face, said flange being provided with a latch engaging portion, a stator housing for the rotor having annular portions spaced respectively from the circumferential face and said flange to cooperate therewith in forming a circumferential way coaxial with said rotor, deflector means fixed to the stator housing and projecting into said way, a latch member adapted to move in said way from a rest position to and from the deflector means and having a latching portion facing said radial flange, a jerk line extending into said way and connected with the latch member, and means carried by the stator housing for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflector for return of the latch member to said rest position incidental to retractive movement of the jerk line.

2. An apparatus of the character described including a rotor adapted to rotate about a fixed axis and having a circumferential face and a flange extending at substantially right angles and circumferentially of said face, said flange having a notch to provide a substantially radial latch engaging portion, a stator housing for the rotor having annular portions spaced respectively from the circumferential face and said flange to cooperate therewith in forming a circumferential way coaxial with said rotor, deflector means fixed to the stator housing and projecting into said way, a latch member adapted to move in said way from a rest position to and from the deflector means in guided contact with the circumferential face and having a hook-like portion facing said right angular flange to move into said notch and engage the radial latch engaging portion of the flange, a jerk line extending into said way and connected with the latch member, and means carried by the stator housing for shifting the latch member transversely of said way to effect engagement of the hook-like portion with the radial latch engaging portion of the rotor to effect pick-up of the latch member by said rotor to move the latch member in said way for exerting a pull on the jerk line under power of the rotor until the latch member is released upon engagement with the deflector for return of the latch member to said rest position incidental to retractive movement of the jerk line.

3. An apparatus of the character described including a rotor adapted to rotate about a fixed axis and having a circumferential face and a flange extending radially and circumferentially at one end of said face, said flange being provided with a latch engaging portion, a stator housing for the rotor having annular portions spaced respectively from the circumferential face and said flange to cooperate therewith in forming a circumferential way coaxial with said rotor, latch control means carried by the stator housing and having a latch engaging rest face at one end and a deflecting face at the other sloping away from said flange, a latch member adapted to move in said way from said rest face to and from the deflecting face and having a latching portion facing said radial flange, a jerk line extending into said way and connected with the latch member, and means carried by the stator housing for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflecting face for return of the latch member to said rest face incidental to retractive movement of the jerk line.

4. An apparatus of the character described including a rotor adapted to rotate about a fixed axis and having a circumferential face and a flange extending radially and circumferentially at one end of said face and a circumferential groove at the other end, said flange being provided with a latch engaging portion, a stator housing for the rotor having an annular wall portion engaging in said groove for maintaining relationship between the stator housing and rotor and a circumferential wall portion carried by the radial wall portion to cooperate with said flange in forming a circumferential way coaxial with said rotor, a deflector carried by said walls of the stator housing and projecting into said way, a latch member corresponding in curvature to said way and adapted to move in said way from a rest position to and from the deflector and having a latching portion facing said radial flange, said latch member being of a size to closely engage the circumferential face and wall portions, a jerk line extending into said way and connected with the latch member, and means carried by the stator housing adjacent said rest position for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflector for return of the latch member to said rest position incidental to retractive movement of the jerk line.

5. An apparatus of the character described including a rotor adapted to rotate about a fixed axis and having a circumferential face and a flange extending at substantially right angles and circumferentially of one end of said face, said flange having a substantially radial latch engaging portion, a stator housing for the rotor having a radial wall portion and an integral circumferential portion spaced respectively from said flange and circumferential face to cooperate therewith in forming a circumferential way coaxial with said rotor, deflector means fixed to the stator housing and projecting into said way, a latch member having inner and outer curved faces adapted to move in substantially close contact with the circumferential face and wall portions when moved in said way from a rest position to and from the deflector means, a hook facing the radial flange to engage the radial latch engaging portion of said flange, a jerk line extending into said wall and connected with the latch member, and means carried by the stator housing adjacent said rest position for shifting the latch member transversely of said way to engage the hook with the radial latch engaging portion of the rotor to effect pick-up of the latch member by said rotor to move the latch member in said way for exerting a pull on the jerk line under power of the rotor until the latch member is released upon engagement with the deflector for return of the latch member to said rest position incidental to retractive movement of the jerk line.

6. An apparatus of the character described including a rotor adapted to rotate about a fixed axis and having a circumferential face and a flange extending radially and circumferentially at one end of said face, said flange being provided with a latch engaging portion, a stator housing for the rotor having wall portions spaced respectively from the circumferential face and said radial flange to cooperate therewith in forming a circumferential way coaxial with said rotor, latch control means carried by the stator housing and having a latch engaging rest face at one end and a deflecting face at the other sloping away from said radial flange, said control means having an opening extending from the way through the control means and stator housing, a latch member adapted to move in said way from said rest face to and from the deflecting face and having a latching portion facing said radial flange, a jerk line extending through said opening and connected with the latch member, and means carried by the stator housing for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflecting face for return of the latch member to said rest face incidental to retractive movement of the jerk line.

7. An apparatus of the character described including a rotor adapted to rotate about a fixed axis and having a circumferential face and a latch engaging portion extending radially at one end of said face, a stator housing for the rotor having annular portions cooperating with said circumferential face to form a circumferential way coaxial with said rotor, deflector means fixed to the stator housing and projecting into said way, a latch member adapted to move in said way from a rest position to and from the deflector means and having a radial latching portion facing said radial latch engaging portion of the rotor, a jerk line extending into said way and connected with the latch member, and means carried by the stator housing for shifting the latch member in a direction parallel with the axis of rotation and transversely of said way to effect engagement of the latching portion with the latch engaging portion of the rotor for effecting movement of the latch member in said way to exert a pull on the jerk line under power of the rotor until the latch member is released upon engagement with the deflector means for return of the latch member to said rest position incidental to retractive movement of the jerk line.

8. An apparatus of the character described including a rotor adapted to rotate about a fixed axis and having a circumferential face and a flange extending radially and circumferentially at one end of said face and a circumferential groove at the other end, said flange being provided with a latch engaging portion, a stator housing for the rotor having an annular portion engaging in said groove and a circumferential portion spaced respectively from the circumferential face and said flange to cooperate therewith in forming a circumferential way coaxial with said rotor, deflector means fixed to the stator housing and projecting into said way, a latch member adapted to move in said way from a rest position to and from the deflector means and having a latching portion facing said radial flange, a jerk line extending into said way and connected with the latch member, means carried by the stator housing for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflector for return of the latch member to said rest position incidental to retractive movement of the jerk line, and resilient means for supporting the stator housing and to cooperate with said groove in retaining relationship of the stator housing and rotor.

9. An apparatus of the character described including a rotor adapted to rotate about a fixed axis and having a circumferential face and a flange extending radially and circumferentially at one end of said face and a circumferential groove at the other end, said flange being provided with a latch engaging portion, a stator housing for the rotor having an annular wall portion engaging in said groove and a circumferential wall portion carried by the radial wall portion to cooperate with said flange in forming a circumferential way coaxial with said rotor, a deflector carried by said walls of the stator housing and projecting into said way, a latch member corresponding in curvature to said way and adapted to move in said way from a rest position to and from the deflector and having a latching portion facing said radial flange, said latch member being of a size to closely engage the circumferential face and wall portion, a jerk line extending into said way and connected with the latch member, means carried by the stator housing adjacent said rest position for shifting the latch member transversely of said way and toward said flange to effect engagement of the latching portion with the latch engaging portion of the rotor for effecting movement of the latch member in said way to exert a pull on the jerk line under power of the rotor until the latch member is released upon engagement with the deflector for return of the latch member to said rest position incidental to retractive movement of the jerk line, and resilient means for supporting the stator housing and to cooperate with said groove in retaining relationship of the stator housing and rotor.

ORREN M. GAHAGAN.

REFERENCES CITED

The following references are of record in the file of this patent:

UNITED STATES PATENTS

| Number | Name | Date |
| --- | --- | --- |
| 2,124,129 | Therolf | July 19, 1938 |
| 2,182,292 | Guier | Dec. 5, 1939 |
| 2,314,733 | Owen | Mar. 23, 1943 |
| 2,452,451 | Gahagan | Oct. 26, 1948 |